(12) United States Patent
Bernardini et al.

(10) Patent No.: US 6,278,457 B1
(45) Date of Patent: *Aug. 21, 2001

(54) METHODS AND APPARATUS FOR PERFORMING SAMPLING BASED SYNTHESIS OF THREE-DIMENSIONAL GEOMETRIC MODELS

(75) Inventors: Fausto Bernardini, Hartsdale; Paul Borrel, Cortlandt Manor; Jai P. Menon, Peekskill, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,682

(22) Filed: Jan. 15, 1998

(51) Int. Cl.[7] .................................................. G06T 15/00
(52) U.S. Cl. ......................... 345/420; 345/423; 345/428
(58) Field of Search .................................... 345/420, 423, 345/428, 419

(56) References Cited

U.S. PATENT DOCUMENTS

| 5,448,686 | * | 9/1995 | Borrel et al. | 395/120 |
| 5,633,951 | * | 5/1997 | Moshfeghi | 382/154 |
| 5,923,333 | * | 7/1999 | Stroyan | 345/422 |

OTHER PUBLICATIONS

Edelsbrunner et al., "Three–Dimensional Alpha Shapes", Jan. 1994.*
Garcia, "Fast Approximation of Range Images by Triangular Meshes Generated through Adaptive Randomized Sampling", 1995.*
Garcia, Miquel Angel, "Fast Approximation of Range Images by Triangular Meshes Generated through Adaptive Randomized Sampling", IEEE, Japan, 1995, 6 pages.
Hoppe, Hugues et al., "Mesh Optimization", Computer Graphics, 1993, pp. 19–25.
Edelsbrunner, Herbert et al., "Three–Dimensional Alpha Shapes", ACM Transactions on Graphics, vol. 13, No. 1, Jan. 1994, pp. 43–72.

* cited by examiner

*Primary Examiner*—Lance W. Segley
(74) *Attorney, Agent, or Firm*—Casey P. August; Perman & Green, LLP

(57) ABSTRACT

A presently preferred computer implemented method for generating a simplified model of a geometric model includes a first step of visualizing a geometric model from at least one viewpoint and then sampling surfaces of the visualized geometric model, from the at least one viewpoint, to generate a set of primary sample points. A next step executes a polyhedral synthesis technique using the set of primary sample points by the steps of performing a three dimensional Delaunay triangulation of the primary sample points to generate triangles; performing alpha-solid extraction using the generated triangles; and executing a boundary computation on the extracted alpha-solid to obtain the simplified model. An optional step refines the simplified model using a set of secondary sample points.

17 Claims, 5 Drawing Sheets

METHODS AND APPARATUS FOR PERFORMING SAMPLING BASED SYNTHESIS OF THREE-DIMENSIONAL GEOMETRIC MODELS

FIELD OF THE INVENTION

This invention relates generally to data processing systems that store, manipulate and display three-dimensional (3-D) geometric models, and more particularly to those systems and methods that employ simplified 3-D geometric models.

BACKGROUND OF THE INVENTION

It is often necessary to generate simplified versions of geometric models. Such simplified models can be used, for example, to display scenes having a polygon count that exceeds the capacity of graphics hardware. The use of simplified models is also advantageous when transmitting a model over a network having a limited bandwidth.

Several algorithms for automatic simplification are currently known in the art. When dealing with curved, finely tessellated surfaces one technique iteratively removes a vertex and incident polygons, and then retessellates the "hole" that is formed. The sequence of vertices considered for removal can be chosen based on simple heuristics or on complex optimization strategies. While this conventional technique normally preserves the topology of the original model its use is, however, restricted to objects with a well defined topology (often to two-manifolds only). Furthermore, this technique cannot, in general, enable a significant reduction in polygon count. Several variants of this method are described in the literature, e.g. by Hughes Hoppe et al. Mesh Optimization, Proc. of SIGGRAPH '93, pp. 19–26.

A different approach is based on collapsing nearby vertices to a single representative vertex, and removing polygons whose area becomes zero. By repeating this process on groups of vertices of increasing size, a hierarchy of simplified models is obtained. This method is fast and can readily handle ill-defined models. The resulting simplified models, however, may not have a desired quality for a particular application. Reference in this regard can be had to commonly assigned U.S. Pat. No. 5,448,686, entitled "Multi-Resolution Graphic Representation Employing at Least One Simplified Model for Interactive Visualization Applications", by Paul Borrel and Jaroslaw R. Rossignac.

While these conventional techniques may be suitable for use for many model simplification problems, it is desirable to provide an improved method that is capable of operating at high speed while providing a simplified model that accurately and faithfully represents an original, more complex model.

OBJECTS AND ADVANTAGES OF THE INVENTION

It is a first object and advantage of this invention to provide an improved geometric model simplification method.

It is a further object and advantage of this invention to provide a method for simplifying a geometric model that samples one or more rendered images of the model, and that derives the simplified model from the sampled images.

SUMMARY OF THE INVENTION

The foregoing and other problems are overcome and the objects and advantages are realized by methods and apparatus in accordance with embodiments of this invention, wherein a technique is disclosed for the automatic synthesis of three-dimensional geometric models. The approach taken by the inventors is based on collecting a number of sample points on a surface of a model, and then reconstructing an approximation of the surface's shape from the samples. Depending on the density of the sampling, simplified models of varying accuracy and complexity can be generated.

More particularly, a presently preferred computer implemented method for generating a simplified version of a geometric model includes a first step of visualizing a geometric model from at least one viewpoint and then sampling surfaces of the visualized geometric model to generate a set of primary sample points. A next step executes a polyhedral synthesis technique using the set of primary sample points by the steps of computing a three dimensional Delaunay triangulation of the primary sample points to generate triangles; extracting an alpha-solid using the generated triangles; and obtaining the simplified model from the boundary of the extracted alpha-solid. An optional step refines the simplified model using a set of secondary sample points.

BRIEF DESCRIPTION OF THE DRAWINGS

The above set forth and other features of the invention are made more apparent in the ensuing Detailed Description of the Invention when read in conjunction with the attached Drawings, wherein:

FIG. 2A depicts a dense triangle mesh representing a surface or surfaces of an object or model that is sampled at a number of points, while

DETAILED DESCRIPTION OF THE INVENTION

Figure 1:
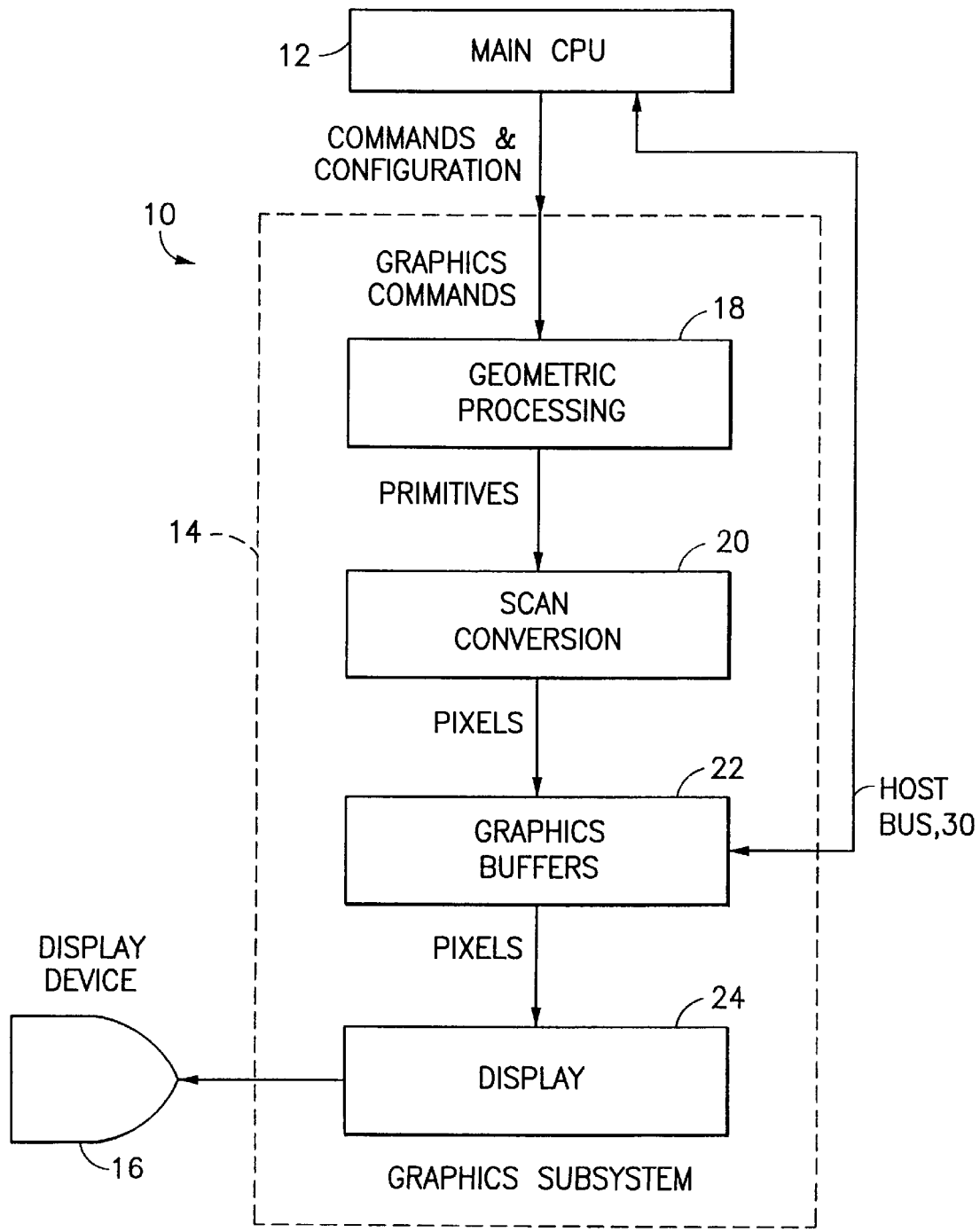
FIG. 1 is a block diagram of an exemplary raster graphics system that is suitable for use in practicing this invention.

An exemplary raster graphics system 10, as illustrated in FIG. 1, includes a main (Host) processor 12 and a graphics subsystem 14. The Host processor 12 executes an application program and dispatches graphics tasks to the graphics subsystem 14.

The graphics subsystem 14 includes several components that perform operations necessary to prepare geometric entities for display on a raster display device 16. For the purposes of describing the invention, a graphics subsystem 14 is employed that contains the following functional units. It should be realized that this particular model is not to be construed in a limiting sense upon the practice of the invention.

A Geometric Processing unit 18 performs geometric and perspective transformations, as well as clipping against screen (window) boundaries. The resulting graphics primitives, e.g. vertices, lines, triangles, etc., are described in screen space coordinates.

A Scan Conversion (Rasterization) unit 20 breaks down the graphics primitives into raster information, i.e. a description of display screen pixels that are covered by the graphics primitives.

A Graphics Buffer unit 22 receives, stores, and processes the pixels in accordance with the method of the invention.

A Display unit 24 receives pixels from the Graphics Buffer unit 22 and transforms these pixels into information displayed on the output device 16, typically a raster screen.

Having described an exemplary graphics processing system that is suitable for use in practicing the invention, a description is now provided of a presently preferred method of 3-D model simplification.

In accordance with this invention the simplification of a 3-D geometric model proceeds in two distinct phases. The first phase involves sampling the surface(s) to be simplified, and the second phase involves a synthesis operation performed on the sampled surface(s).

Figure 2A:
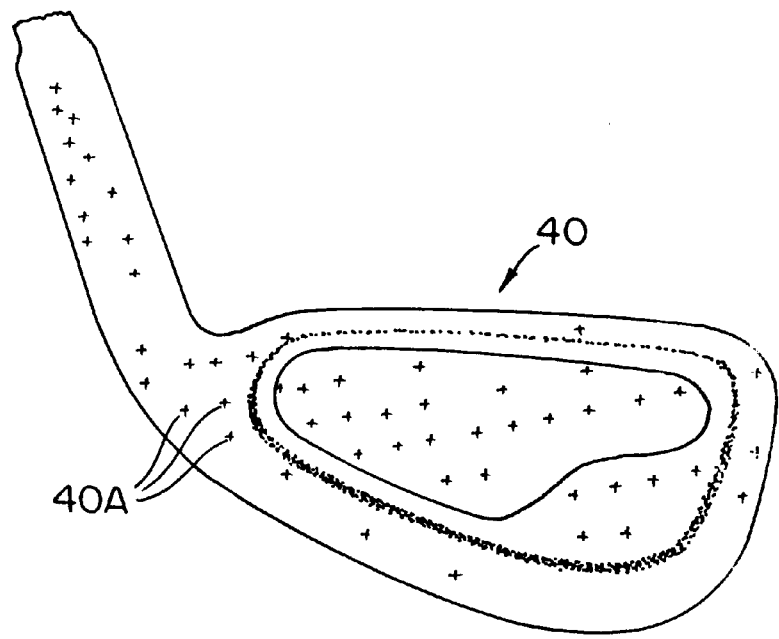
Figure 2B:
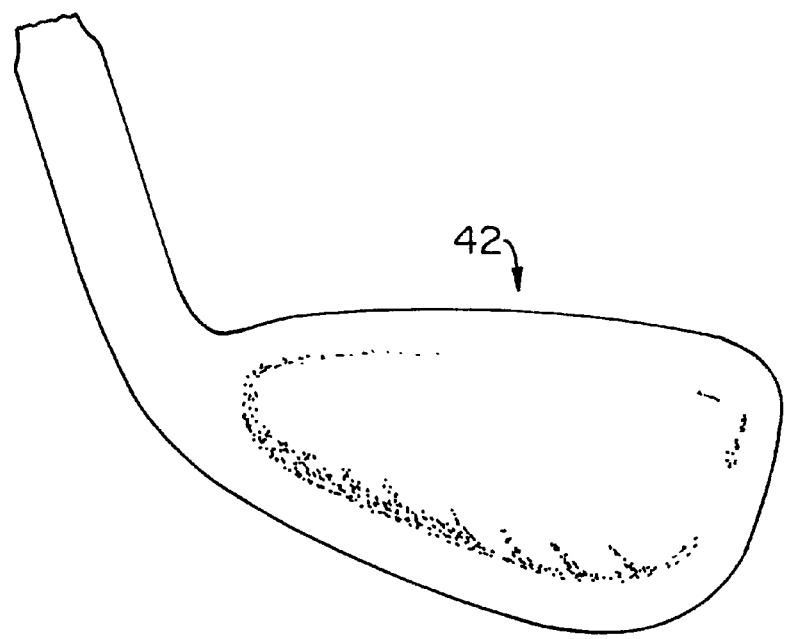
FIG. 2B illustrates a coarser mesh that is synthesized from the sample points in accordance with the teachings of this invention.

Referring to FIG. 2A, a dense triangle mesh representing a surface or surfaces 40 of an object model (e.g., the head of golf club) is sampled at a number of points (shown as dots 40A). Referring to FIG. 2B, a coarser mesh is then synthesized from the sample points, representing a simplified model of the object model.

In the first phase, the visualized surface 40 of the object model is sampled at a number of points 40A. The density of the sampling can be specified by the user as a tradeoff between the quality of the approximation and the complexity of the simplified model. Sample points (<x, y, z>-tuples) may optionally be augmented with attribute information, such as color, surface normal, texture, etc. Although described in the context of user-selected sampling densities and the like, it is within the scope of this invention to execute the method under the control of software and without user intervention.

One of several possible approaches may be taken to collect sample points. In the preferred embodiment, the object model is rendered from a sequence of viewpoints with the apparatus shown in FIG. 1, using a common z-buffer (depth buffer) based rendering engine (e.g., one known in the art as OpenGL). For each view, the method reads z-buffer values at a number of points on the display screen 24 (screen space), and then applies an inverse viewing transformation (available from the graphics library) to compute corresponding points in object space. The inverse viewing transformation is a well-known inverse of the viewing matrix used by the graphics library to map points from the 3-D models to the normalized viewing volume (a 1×1×1 cube).

More specifically, during the rendering of a geometric database to a graphics display, each vertex of the model is transformed from "world" coordinates (the coordinate system used to describe the model) to screen or "device" coordinates, i.e. the coordinates of the corresponding pixel (dot) on the display screen 16. Not only is the x, y position of the pixel on the screen computed, but a depth (or z coordinate) is computed as well. The depth information is maintained in the z-buffer and is used to display only the visible part of the scene using any of several z-buffer algorithms.

The coordinate transformation can be implemented by providing a graphics library (e.g. OpenGL) that maintains a transformation matrix (a 4×4 array of values), and then multiplying each vertex by the transformation matrix.

The inverse transformation matrix is obtained by inverting the transformation matrix (a standard linear algebraic operation). By multiplying a point in device coordinates by the inverse matrix, the original (world coordinate) vertex is obtained.

To summarize, the inverse viewing transformation involves making a graphics library call to obtain the current transformation matrix, inverting the matrix, and then multiplying each sample point 40A by the inverse matrix to obtain corresponding vertices in world (model space) coordinates.

It is also within the scope of the teaching of this invention to compute and associate one or more attributes with each point, such as a Red-Green-Blue (RGB) color tuple, a surface normal, texture coordinates, etc.

It is important to note that this method is not restricted to polygonal meshes. The sampling technique described above can be applied to any object which can be visualized on a z-buffer based rendering engine.

While the presently preferred synthesis technique that is described below does not require that the sampling have special qualities, it has been found that the quality of the reconstruction is improved if the sampling is substantially uniform and captures important geometric features of the model. Image analysis techniques (detection of discontinuities or high-gradient regions) can be employed to choose an optimum set of sample points from each rendered image. By example, reference can be had to a technique disclosed by Miguel Angel Garcia, "Fast Approximation of Range Images by Triangular Meshes Generated through Adaptive Randomized Sampling", IEEE International Conference on Robotics and Automation, Nagoya, Japan, 1995. This or a similar technique is suitable for use with this invention for defining an optimum sampling strategy.

In the second step of the method, a polyhedral synthesis algorithm is employed to compute a triangle mesh that interpolates the sample points 40A, thereby approximating the shape of the original object. In addition, the optional attribute information may be re-mapped onto the surface of the simplified object. Interpolation of the sample points 40A can be equivalent to assigning the sample points to the vertices of the triangles.

In the synthesis step a presently preferred reconstruction algorithm is similar in some respects to one described by one of the inventors (Fausto Bernardini) in "Automatic Reconstruction of CAD Models and Properties from Digital Scans", Ph.D. Thesis, Purdue University, Department of Computer Sciences, December 1996.

In general, the reconstruction algorithm generates a two-manifold triangle mesh that interpolates the sample points 40A, thereby approximating the shape of the original model.

In a first step the method computes a 3-D Delaunay triangulation of the points 40A. Next, the method applies alpha-solids that are based on alpha-shapes to select a subset of tetrahedra whose boundary is a two-manifold that contains all sample points 40A. Delaunay triangulations were first introduced by B. Delaunay in "Sur la sphere vide", Izvestia Akademii Nauk SSSR, Otdelenie Matematicheskii i Estestvennyka Nauk 7, 793-800 (1934). A finite point set S $\subseteq R^3$ defines a special triangulation known as the Delaunay triangulation of S. Assuming general position of the points, this triangulation is unique and decomposes the convex hull of S into tetrahedra.

For $0 \leq k \leq 3$, let $F_k$ be the set of k-simplices $\sigma_r$=conv (T), $T \subseteq S$ and $|T|=k+1$, for which there are empty open balls b with $\partial b \cap S=T$. Notice that $F_o=S$. The Delaunay triangulation of S, denoted herein by D, is the simplicial complex defined by the tetrahedra in $F_3$, the triangles $F_2$, the edges in $F_1$, and the vertices in $F_o$.

An alpha-shape is a subcomplex of the Delaunay triangulation. When the parameter alpha varies from zero to infinity, one obtains a finite collection of alpha-shapes, ranging from the original set of points to its convex hull. For intermediate values of alpha, the alpha-shape tends to connect together points based on vicinity. For a reasonably uniform sampling, alpha-solids naturally select a subset of tetrahedra which approximates the shape of the object. Reference in this regard can be had to a publication by Herbert Edelsbrunner et al., "Three-dimensional alpha shapes", ACM Trans. on Graphics, 13 (1):43–72, January 1994.

In greater detail: conceptually the α-shapes may be considered as a generalization of the convex hull of a point set. Let S be a finite set in a three dimensional space $R^3$ and α a real number with $0 \leq \alpha \leq x$. The α-shape of S is a polytope that is neither necessarily convex nor necessarily connected. For a α=x, the α-shape is identical to the convex hull of S. However, as α decreases, the α-shape shrinks by gradually developing cavities. These cavities may join to form tunnels, and holes may appear (see FIG. 3). Intuitively, a portion of the polytope disappears when α becomes small enough so that a sphere with radius α, or several such spheres, can occupy its space without enclosing any of the points of S.

An α-shape is a polytope in a fairly general sense: it can be concave and even disconnected; it can contain two-dimensional patches of triangles and one dimensional strings of edges; and its components can be as small as single points.

An α-solid is a homogeneously three-dimensional polytope computed from the corresponding α-shape. An α-solid is the set union of all Delaunay tetrahedra that either are part of the α-shape or are enclosed by a continuous mesh of α-shape triangles. Computing an α-solid from a given α-shape proceeds as follows. First, the adjacency graph of the triangulation is traversed starting from a "seed" tetrahedron that is known to be outside the α-solid. In the traversal, the crossing triangles that belong to the α-shape is avoided. All tetrahedra that are reachable in this manner are marked as "exterior". The visit starts again from an unmarked tetrahedron adjacent to a marked one. All tetrahedra reachable by this second traversal are marked as "interior". The procedure then continues with new traversals, alternating between "exterior" and "interior" marks, until all tetrahedra are marked. In the end, the set of tetrahedra marked as "interior" constitutes the α-solid.

To make the reconstruction process automatic, a procedure is employed to select an optimal value for the parameter α. This optimal value is defined as the minimum value α such that the corresponding α-solid contains all of the primary sample points either on its boundary or in its interior, and can be computed by performing a binary search on the set of possible α-shapes. Since the number of different α-shapes is polynomial in the number n of sample points, the binary search takes at most O (log n) iterations. Also, it should be noted that an optimal α value always exists, in that the convex hull of the sample points satisfies the optimality requirements. In practice however, for a reasonably good sampling, the optimal α-solid tends to be a good approximation of the original shape.

The boundary of the α-solid is a triangle mesh that approximates the surface of the original model, and can be extracted from the α-solid by collecting all triangles that are shared by one interior and one exterior tetrahedra.

Figure 3:
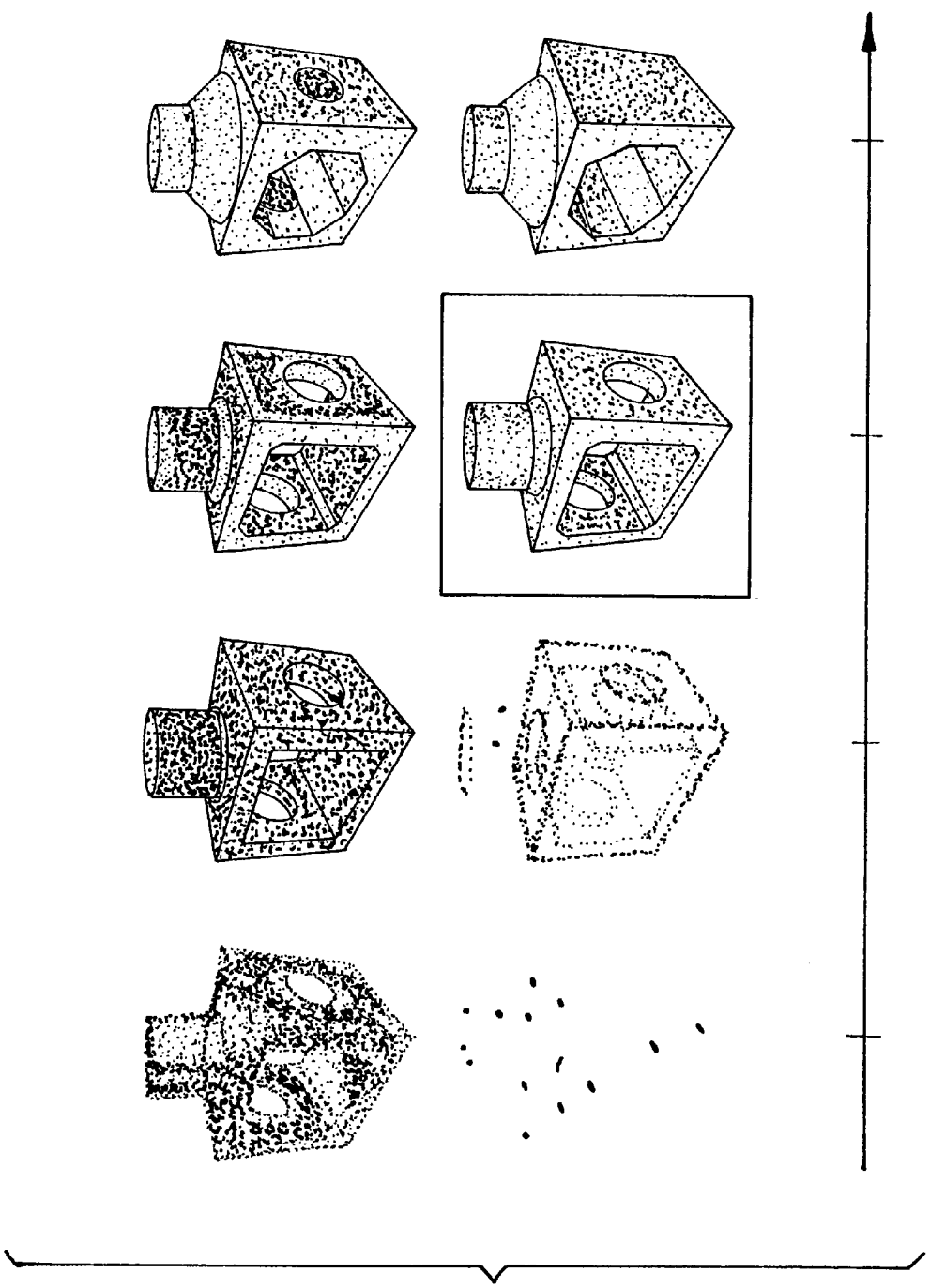
FIG. 3 is a pictorial representation of alpha-shapes and alpha-solids, and is useful in understanding the synthesis step of this invention.

FIG. 3 illustrates pictorial representations of alpha-shapes and alpha-solids. The top row shows four different alpha-shapes for increasing values of the parameter alpha. The bottom row shows the corresponding alpha-solids. The object shown enclosed within a frame is one that has been selected as the optimal shape approximation for the given sampling.

While alpha-solids are practical to compute for sets of up to a few thousand sampling points, they require considerable computing resources for larger data sets. To alleviate this problem, and in accordance with an aspect of this invention, the method initially samples the model at a lower sampling density to obtain a set of primary sample points. The primary sample point set is used in the reconstruction phase to compute the 3-D Delaunay triangulation and to then extract therefrom an alpha-solid. A next step adds points from a finer sampling of the model (secondary samples), and uses this second set of points to locally improve the fitting of the reconstructed model to the original. This is done by projecting each additional point to the closest face in the alpha-solid boundary, retriangulating the face to accommodate the new points, and finally reprojecting the new points back to their original position. In this way the topology and large scale geometric features of the model are captured by the alpha-solid, while smaller scale details are reconstructed by the local retriangulation and fitting process.

The presently preferred reconstruction algorithm relies on vicinity to connect sample points 40A together so as to form a polygonal surface. In order to do this reliably, the locations of the sample points 40A and the spacing between them should meet certain criteria. A first criterion is that the spacing should be uniform; that is, roughly the same number of sample points per unit surface area. A second criterion is that the sample point spacing is small with respect to the dimensions of geometric features that are desired to be captured in the simplified model. A third criterion is that the sample points 40A be located on important geometric features (for example, the edges of a cube).

The first criterion is preferably met by sampling the model from a plurality of viewpoints, such that each part of the model's surface is visible from at least one viewpoint, and by adapting the density of the sampling to the characteristics of the surface (e.g., the high-gradient regions are sampled more frequently than lower gradient regions). However, and as will be described below, in some applications it may be desirable to limit or restrict the number of viewpoints from which the object is rendered and sampled.

The second criterion can be met by a user-specified parameter that trades off the accuracy of the approximation against the complexity of the reconstructed model. An appropriate sampling density can be determined visually, by observing the quality of the result, and/or can be determined based on a knowledge of the approximation required by the application of interest.

The third criterion can be achieved by detecting edges in the z-buffered image using a standard graphics algorithm. The standard graphics algorithm essentially compares z-values of neighboring vertices and decides whether there is a significant change in curvature, or a discontinuity. If such a change is detected, then sampling points 40A are located at the corresponding points of the model so as to capture the edge-related portions of the model.

Figure 4:
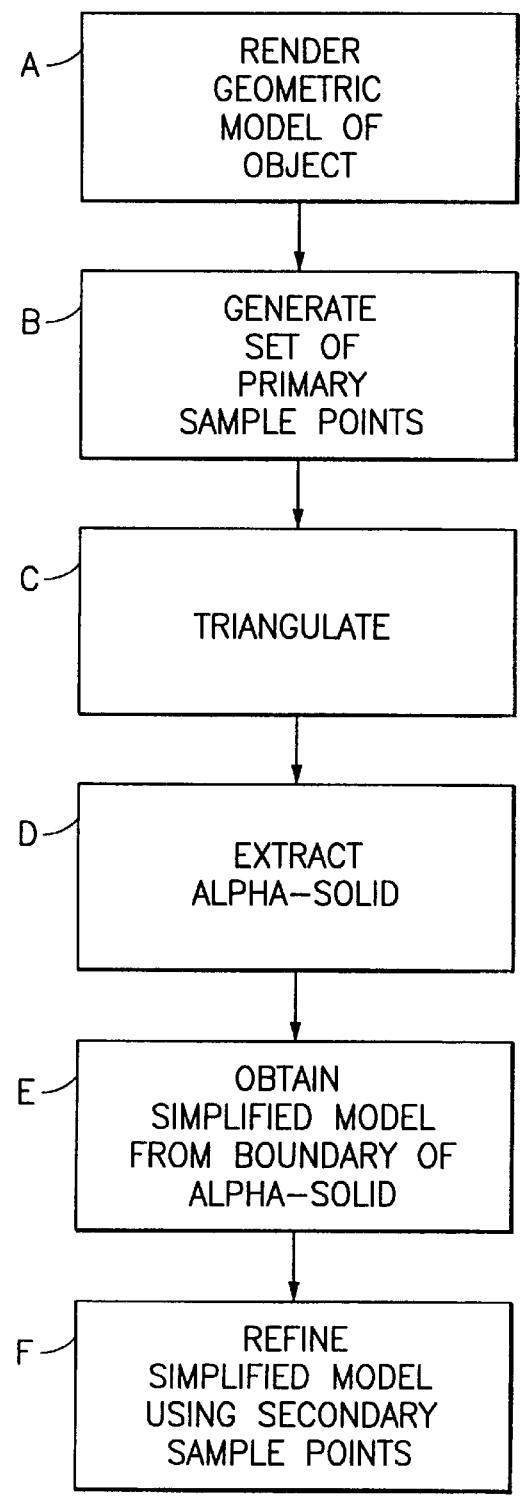
FIG. 4 is a logic flow diagram depicting a method in accordance with this invention.

A method in accordance with this invention can thus be described in reference to FIG. 4. More particularly, a computer implemented method for generating a simplified model of a geometric model includes a first step of visualizing a geometric model from at least one viewpoint and then sampling surfaces of the visualized geometric model, from the at least one viewpoint, to generate a set of primary sample points (Blocks A and B). A next step executes a polyhedral synthesis technique using the set of primary sample points by the steps of (Block C) performing a three dimensional Delaunay triangulation of the primary sample points to generate triangles; (Block D) performing alpha-solid extraction using the generated triangles; and (Block E) obtaining the simplified model from the boundary of the extracted alpha-solid. An optional step (Block F) refines the simplified model using a set of secondary sample points.

Figure 5:
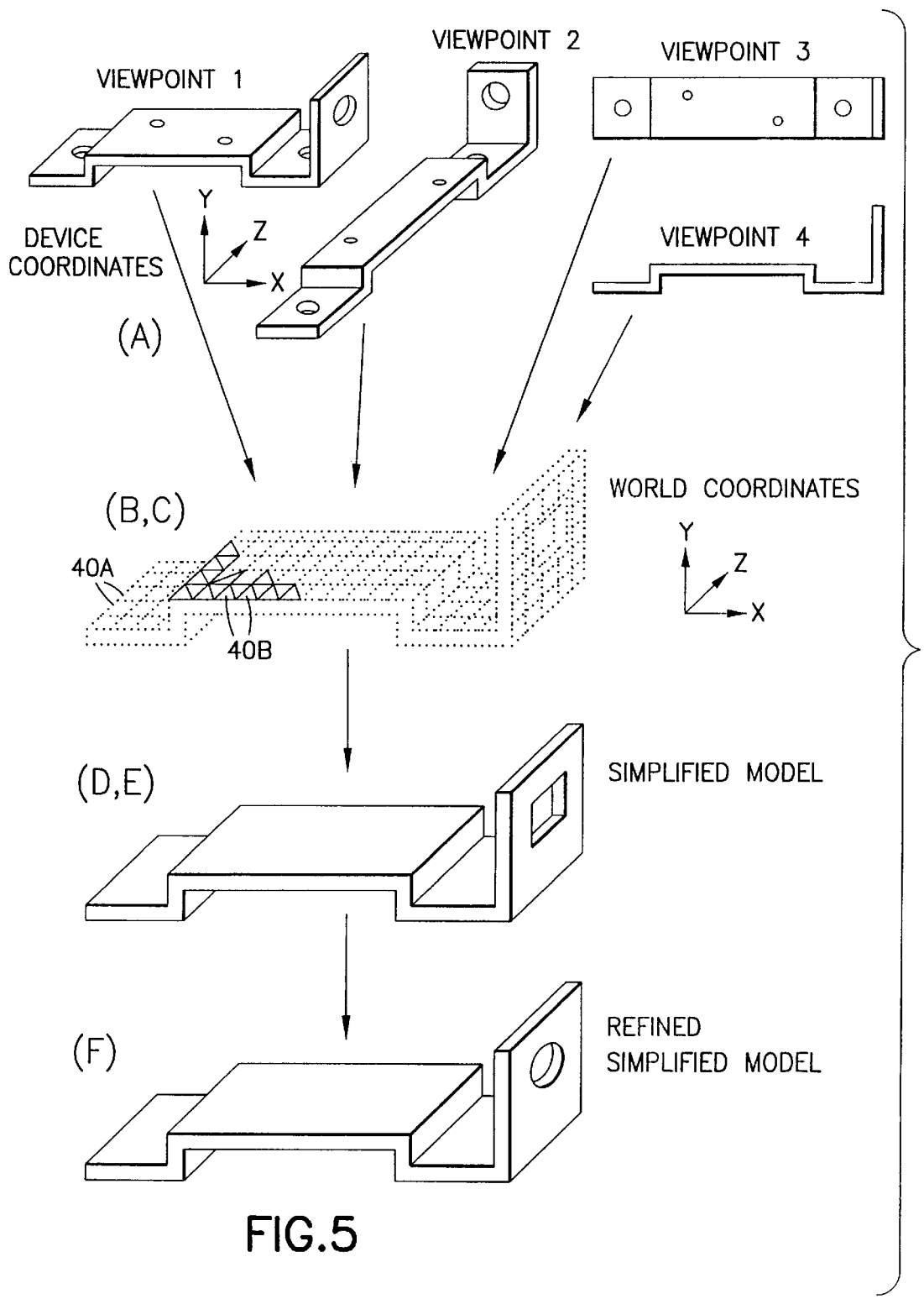
FIG. 5 is a pictorial representation of the method depicted in FIG. 4.

Referring to FIG. 5, the foregoing method is pictorially illustrated for a geometric model of a mechanical structure having a plurality of surfaces and surface voids (i.e., through holes of various diameters). Step A of the method renders the geometric model from, for example, four different viewpoints. Visualized surfaces in device coordinates are sampled for each of the four views, resulting in a set of primary sample points 40A, which may be considered as a "cloud" of sample points (Step B). Each sample point has an associated x, y, z coordinate in world coordinate space, which is obtained using the above-referenced inverse transformation from the device coordinates. One or more surface attributes can also be associated with each of the primary sample points 40A, as described previously. The cloud of primary sample points is then triangulated (Step C) using, preferably, the Delaunay triangulation method to generate triangles 40B (only a few of which are shown). Steps D and E extract the alpha-solid from the set of surface triangles and then obtain the simplified model from the boundary of the extracted alpha-solid. Note that in this case the original geometric model has been simplified to the extent that the smaller through holes no longer appear, while the largest through hole is modelled as a rectangular aperture. If a finer sampling grid had been initially selected to generate the primary set of sampling points 40A then not all of the through holes may have been eliminated from the simplified model, while a coarser sampling grid may have eliminated the largest through hole as well. The optional step F employs the secondary set of sampling points to refine the surface of the simplified model, in this case restoring the largest through hole to its correct circular shape.

One advantage of the use of this invention is that the amount of calculations involved is basically independent of the complexity of the original model. Except for the rendering step, sampling is done in screen space, and is therefore inherently fast. The synthesis phase depends on the amount of sample points, and is therefore output-sensitive. In contrast, existing techniques progressively remove details from the original model, and require more computations for complex models.

Furthermore, the method can be used to advantage with an unorganized collection of polygons, higher order primitives, and objects defined in an application-dependent manner, as long as they can be rendered on a z-buffered raster display.

Another advantage of this invention is that interior details are automatically culled, resulting in a simplified model that only contains information on visible parts of the object. It is also straightforward to mask parts of the object that a user may wish to hide, for example to protect proprietary information.

In a related manner, the set of sample points 40A can be derived in a viewpoint dependent fashion, so as not to synthesize occluded/unimportant/confidential portions of the geometric model of interest. For example, a user may decide to share with other users only that portion of the geometric model that is visible from a particular viewpoint. The object may then be sampled from only that viewpoint, and an approximate model that contains only the necessary information may be synthesized.

One important application of the method is for "interior culling", a procedure useful in layered manufacturing. Since only the visible part of the object is sampled, internal details are automatically not included in the reconstructed model. The model simplification is also useful for functional culling by automatically removing secondary geometric details (fillets, bosses, etc.). This can be accomplished by sampling only the primary geometry of the object, thereby eliminating the secondary geometric aspects of lesser interest (see FIG. 5).

The model simplification method in accordance with this invention is performed in such a way as to guarantee consistency between interfaces of parts in an assembly, by using the same sampling on all touching interfaces.

The teaching of this invention can also be applied to generating an approximation of mechanisms in motion as a sequence of models reconstructed from snapshots, as well as to generating an approximation of an object of unknown geometry for which only rendering can be performed.

By sampling a collection of objects and then executing the presently preferred polyhedral synthesis the collection of objects can be simplified as a single entity.

The teachings of this invention furthermore enable an interactive selection of a level of detail for different parts of the object, as the user can be guided by the rendered image of the object.

It should further be noted that the teachings of this invention are amenable to producing a hierarchy of simplifications from different sample sets of points 40A. This technique is useful for, by example, progressively transmitting the geometric model over a communication link.

Also, there is no requirement that the steps of rendering the object and generating the set of sample points 40A, and then executing the polyhedral synthesis on the set of sample points, be executed in one data processor. For example, the set of sample points 40A can be obtained in a first data processor, and then transmitted to a second data processor where the polyhedral synthesis is performed.

Thus, while the invention has been particularly shown and described with respect to preferred embodiments thereof, it will be understood by those skilled in the art that changes in form and details may be made therein without departing from the scope and spirit of the invention.

What is claimed is:

1. A computer implemented method for generating an approximation of a geometric model of an object, comprising the steps of:

rendering the geometric model from a plurality of viewpoints to obtain a corresponding plurality of only surface views of the visible surface of the geometric model, the surface views being selected so as to mask parts of the object;

obtaining, from the plurality of surface views, a set of surface sample points; and synthesizing a triangle mesh that interpolates the sample points for approximating the shape of the geometric model.

2. A method as in claim 1, wherein the step of synthesizing includes steps of:

computing a three dimensional triangulation of the sample points;

in accordance with the triangulation, using alpha-solids to select a subset of tetrahedra which approximate the shape of the geometric model; and using a boundary of the selected subset of tetrahedra as the approximation of the geometric model.

3. A method as in claim 1, wherein the step of obtaining includes steps of:

for selected surface sample points, determining an associated depth value; and transforming device coordinates for each selected surface sample point to model world coordinates.

4. A method as in claim 1, wherein said surface views are selected so as to mask internal details of the object.

5. A computer implemented method for generating a simplified model of a geometric model of an object, comprising the steps of:

sampling only visible surface views of the geometric model from at least one viewpoint to generate a set of primary sample points, said sample points being selected so as to mask parts of the object; and executing a polyhedral synthesis using the set of primary sample points by the steps of, performing a three dimensional Delaunay triangulation of the primary sample points to generate triangles;

performing alpha-solid extraction using the generated triangles; and obtaining the simplified model from the boundary of the extracted alpha-solid.

6. A method as in claim 5, and further comprising a step of refining the simplified model using a set of secondary sample points.

7. A method as in claim 5, and further including a step of incorporating attribute information into the simplified model.

8. A method as in claim 5, wherein a plurality of sets of primary sample points are generated to produce a hierarchy of simplified models.

9. A method as in claim 5, wherein the step of sampling surfaces of the geometric model and the step of executing a polyhedral synthesis are performed with one data processor.

10. A method as in claim 5, wherein the step of sampling surfaces of the geometric model is performed with one data processor, and wherein the step of executing a polyhedral synthesis is performed with another data processor.

11. A method as in claim 5, wherein sample points are incrementally added so as to incrementally extend a triangle mesh on the surface by one new triangle, and wherein the new triangle is connected to the existing boundary of the triangle mesh.

12. A method as in claim 11, wherein sample points are incrementally added by projecting each additional point to a closest face in the boundary of the alpha-solid, retriangulating the face to accommodate the sample point which has been added, and reprojecting the sample points which have been added back to their original position.

13. A method as in claim 5, wherein said sample points are selected so as to mask internal details of the object.

14. A data processing system, comprising:

a rendering unit and display for visualizing an object model from at least one viewpoint;

a sampling unit for sampling only visible surface views of the visualized object model to generate a set of primary sample points, said sample points being selected so as to mask parts of the object; and an execution unit for executing a polyhedral synthesis using the set of primary sample points, said execution unit comprising means for performing a three dimensional Delaunay triangulation of the primary sample points; means for performing alpha-solid extraction using the Delaunay triangulation; and means for obtaining a simplified object model from the boundary of the extracted alpha-solid.

15. A data processing system as in claim 14, wherein said execution unit further comprise means for refining the simplified model using a set of secondary sample points.

16. A data processing system as in claim 14, wherein said rendering unit is comprised of a z-buffer, and wherein said sampling unit obtains said primary sample points by transforming x, y, z display coordinates of each primary sample point to world coordinates on said object model.

17. A data processing system as in claim 14, wherein said sampling unit samples said points so that internal details of the object are masked.

* * * * *